United States Patent Office 2,823,419
Patented Feb. 18, 1958

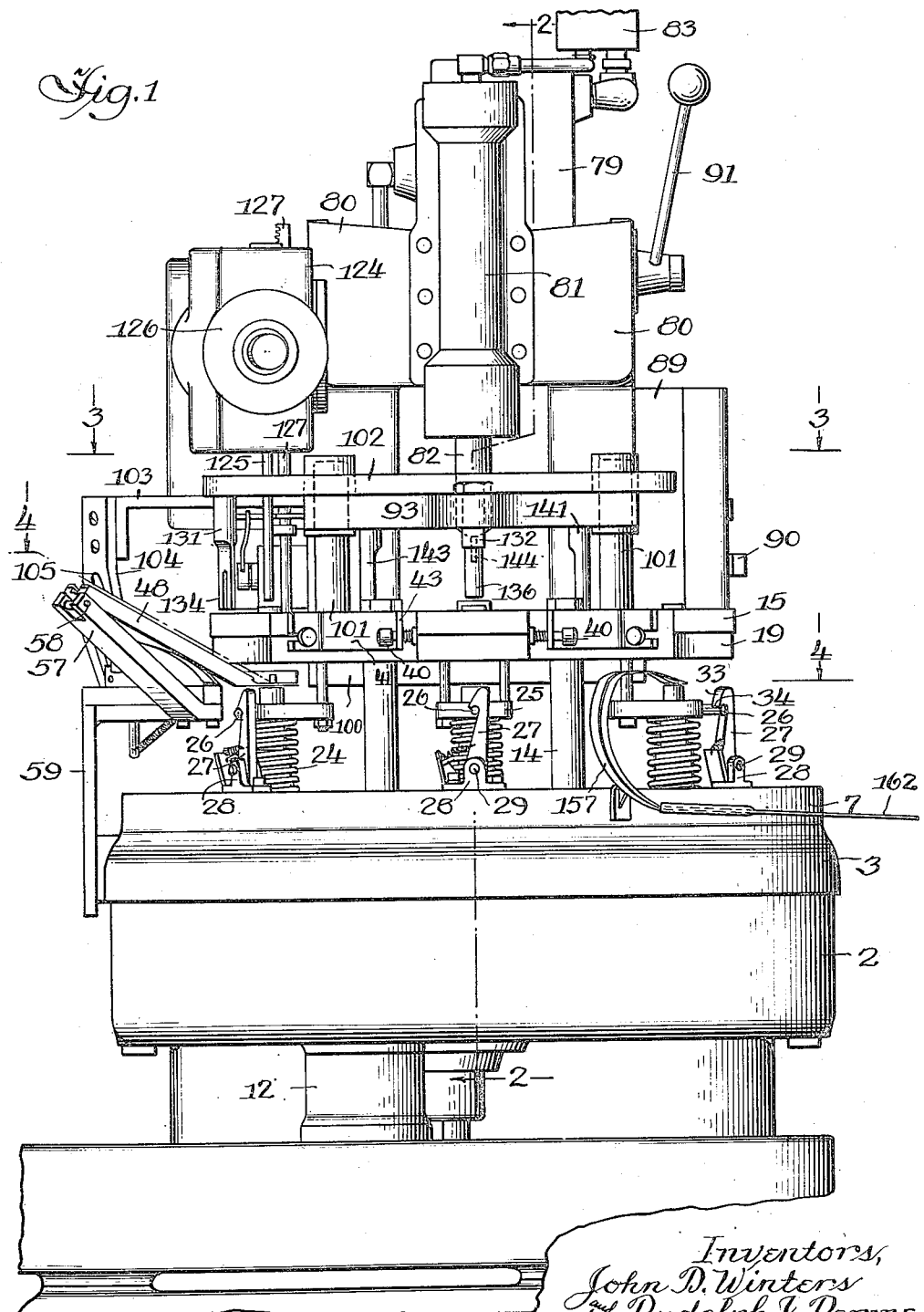

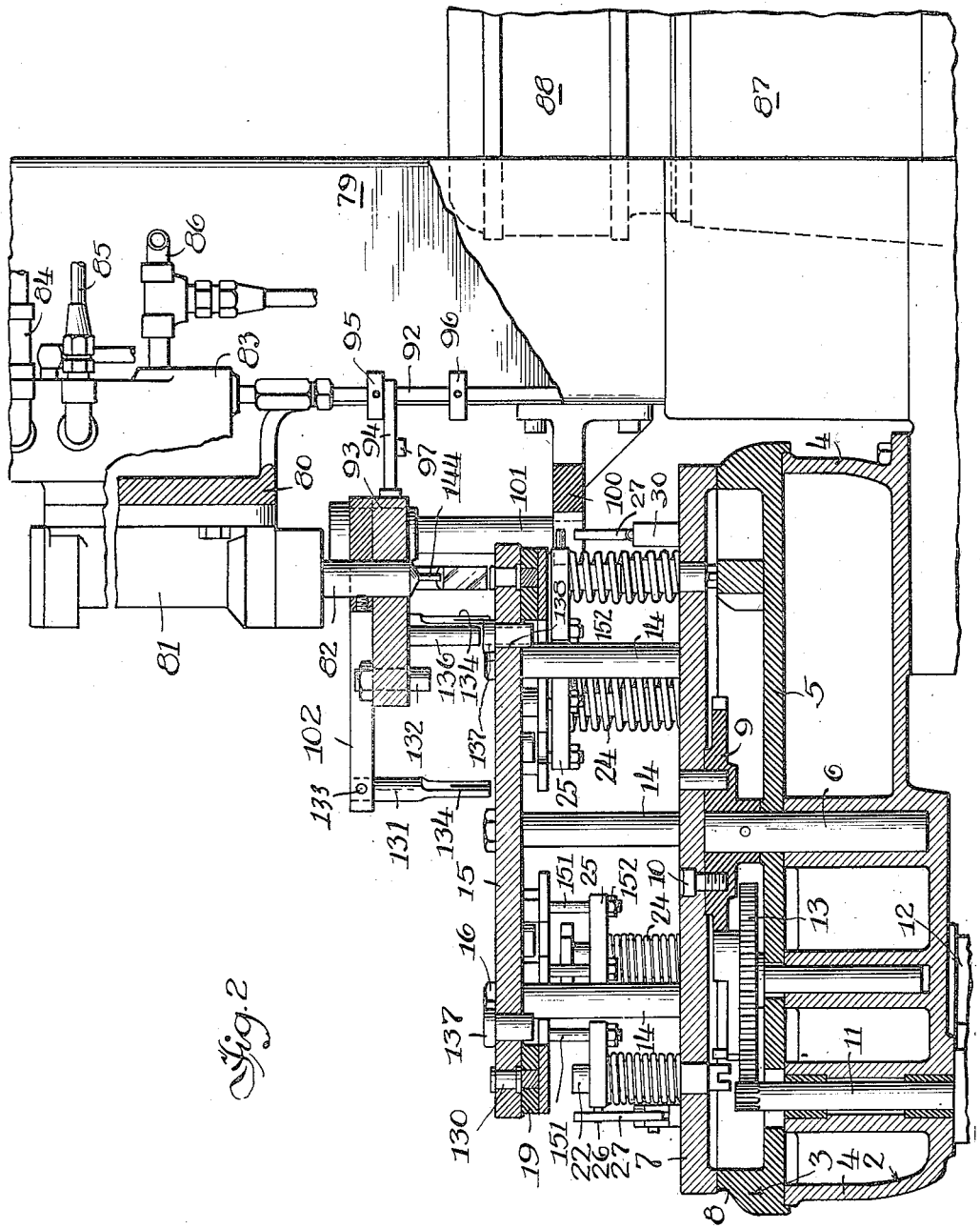

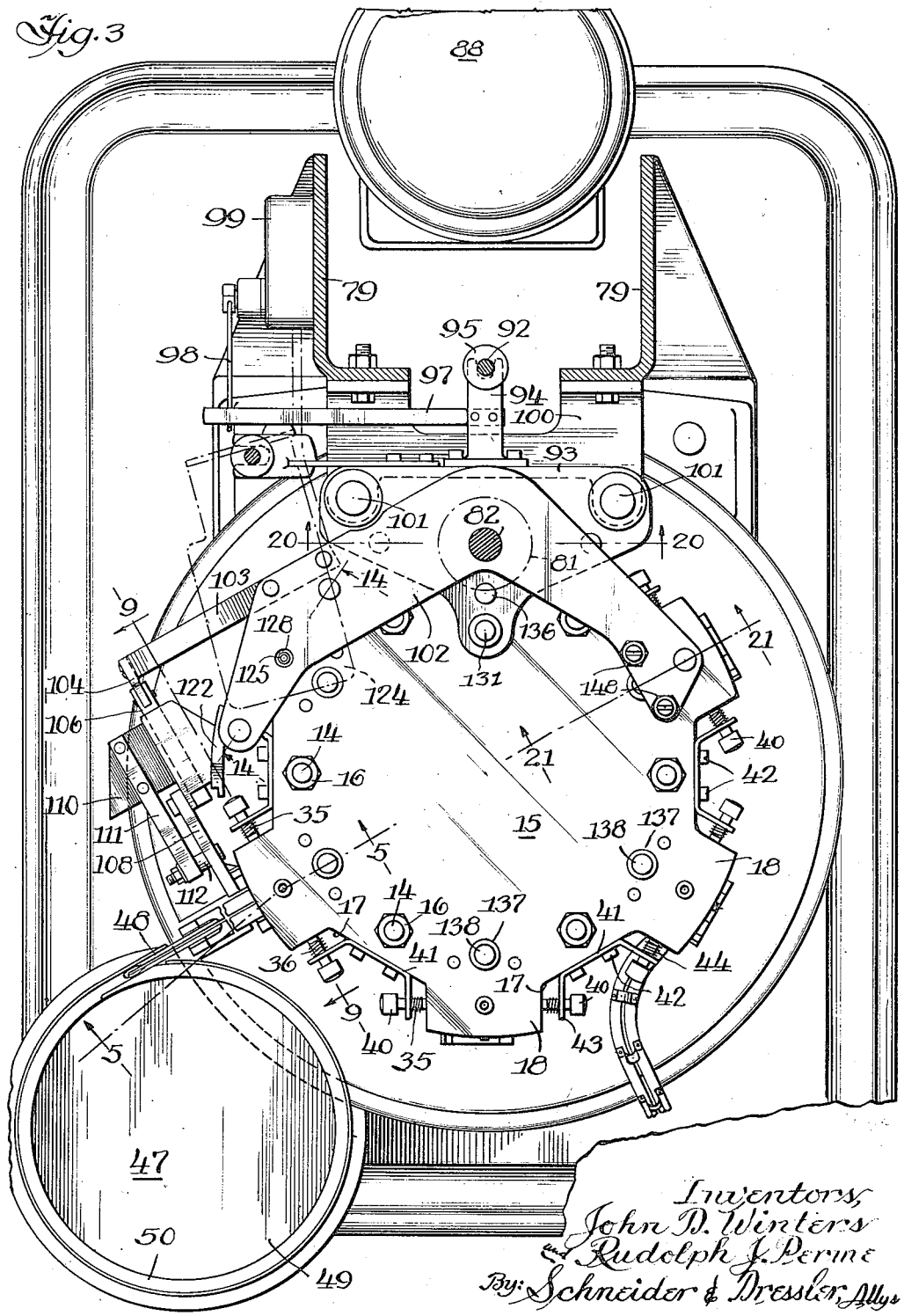

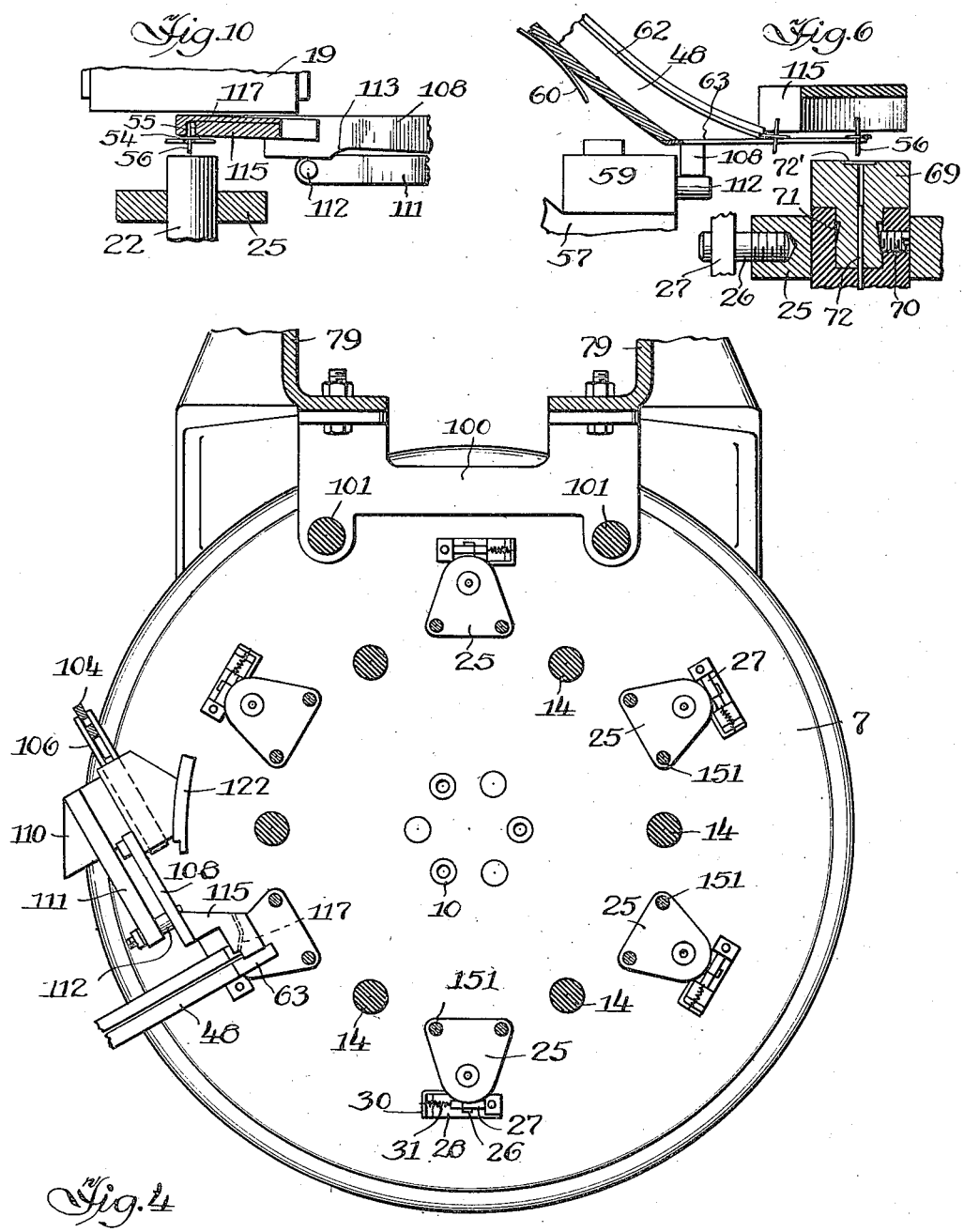

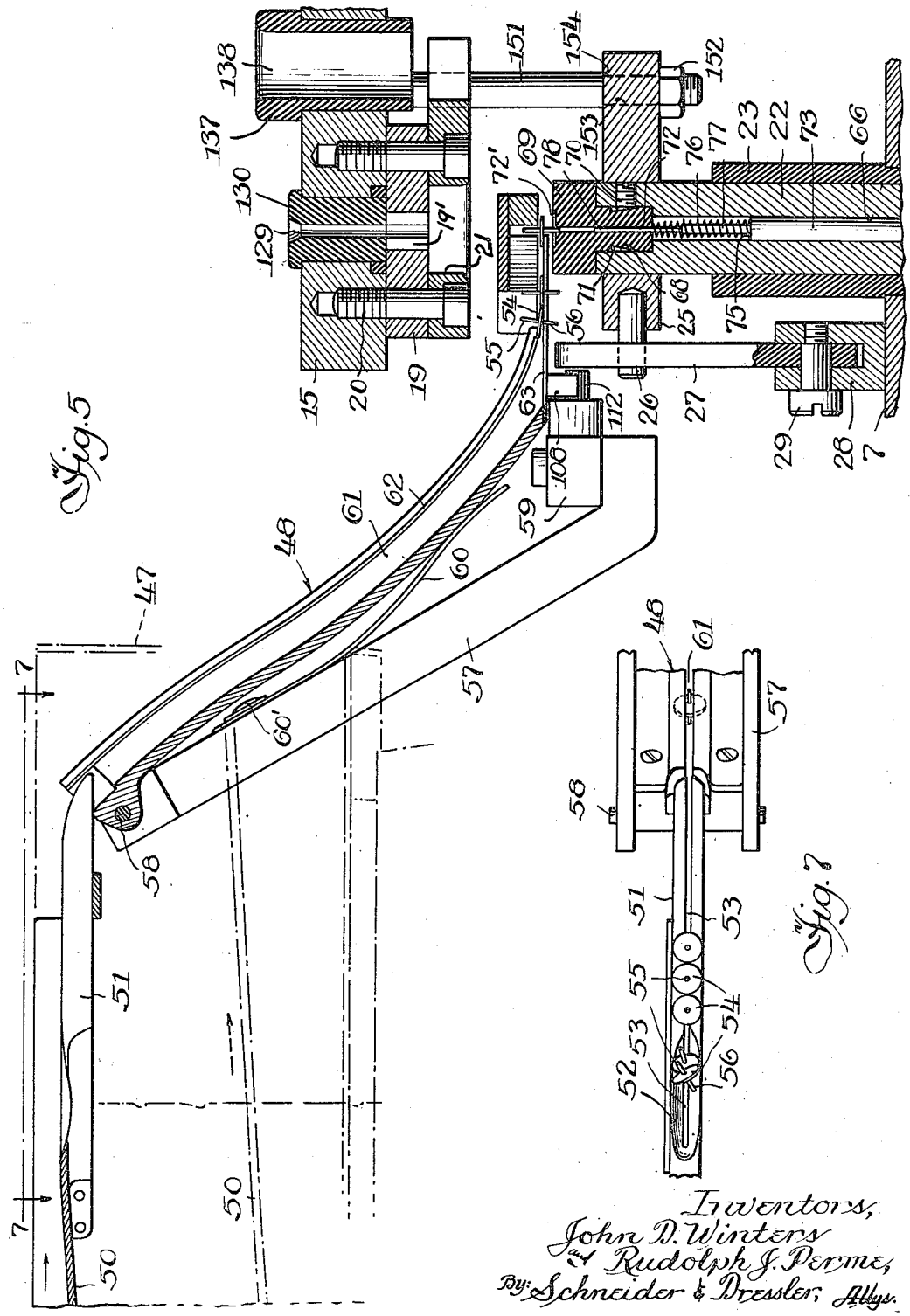

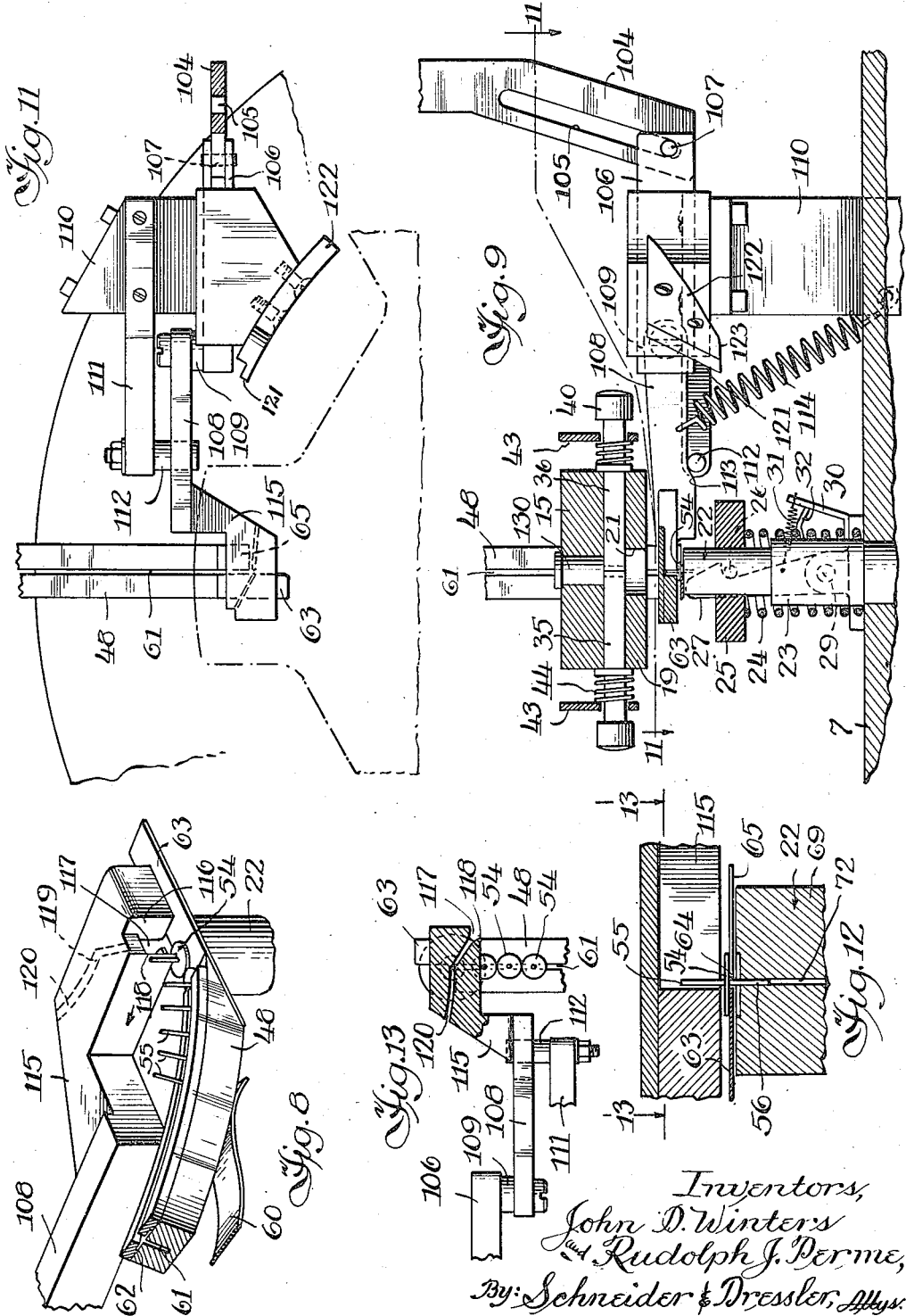

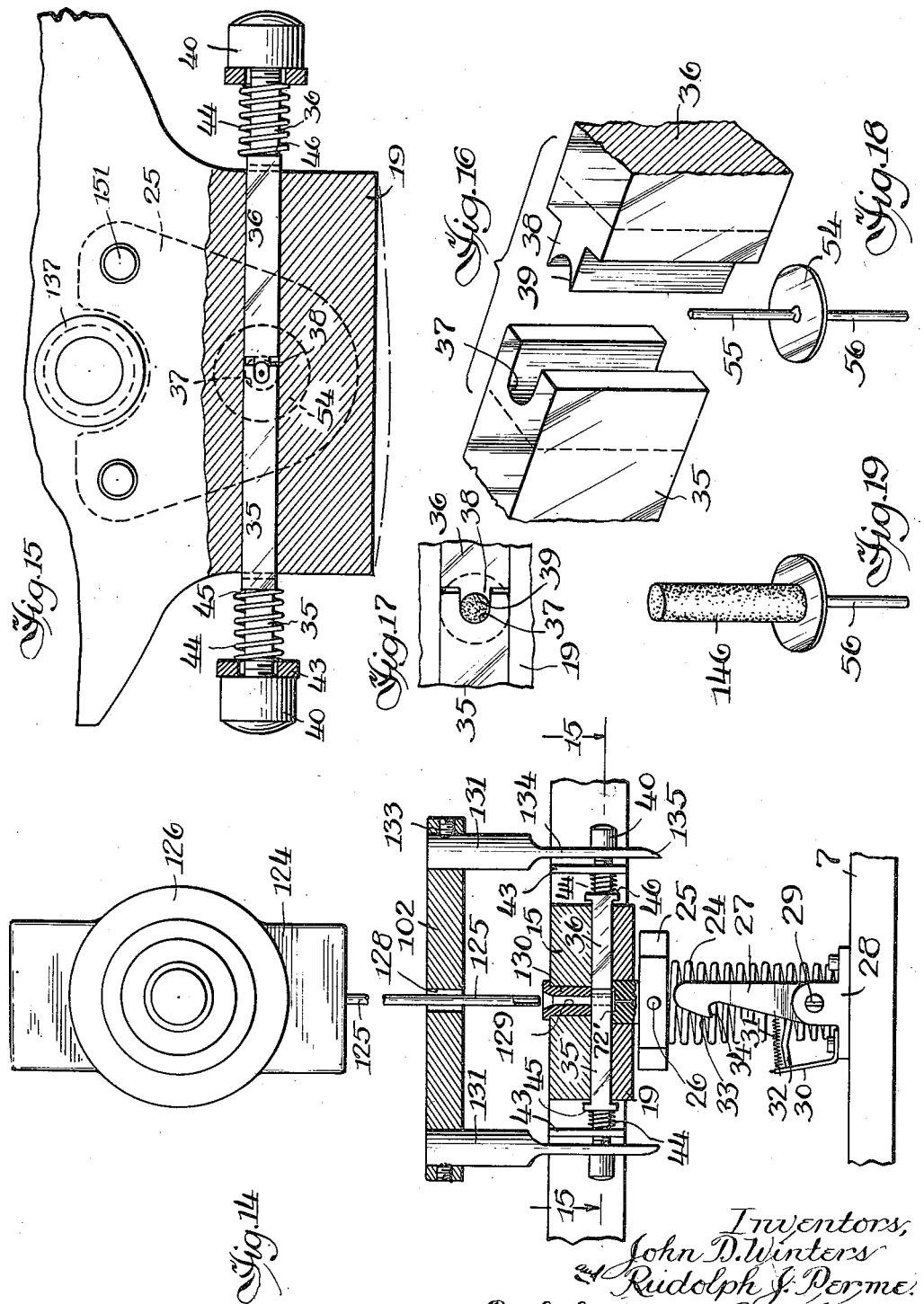

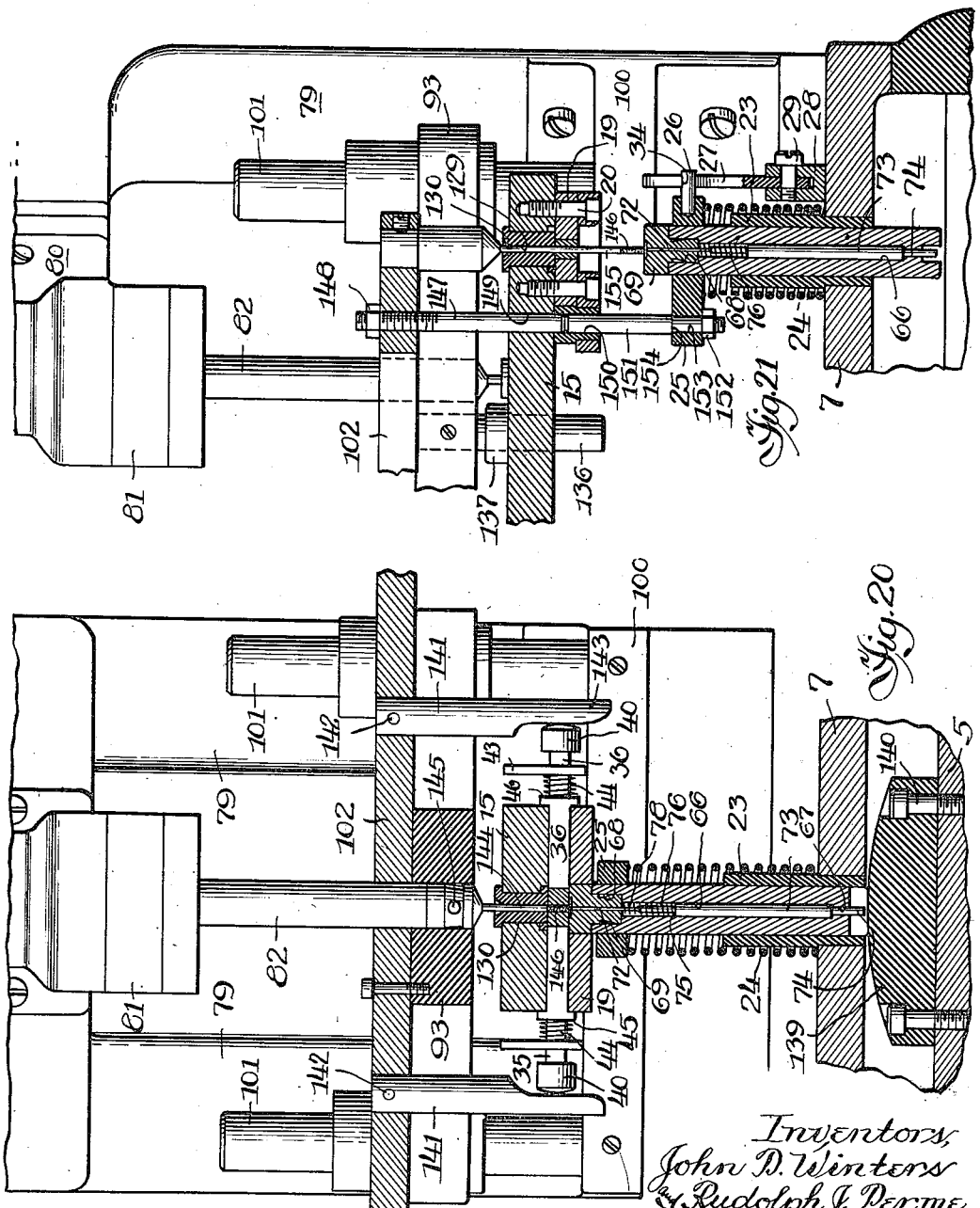

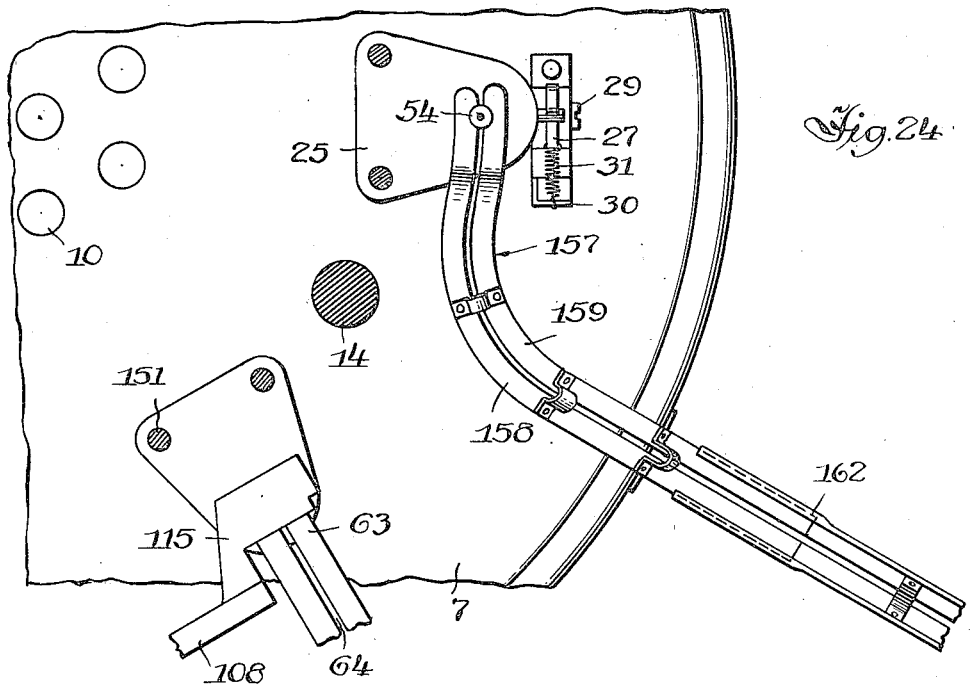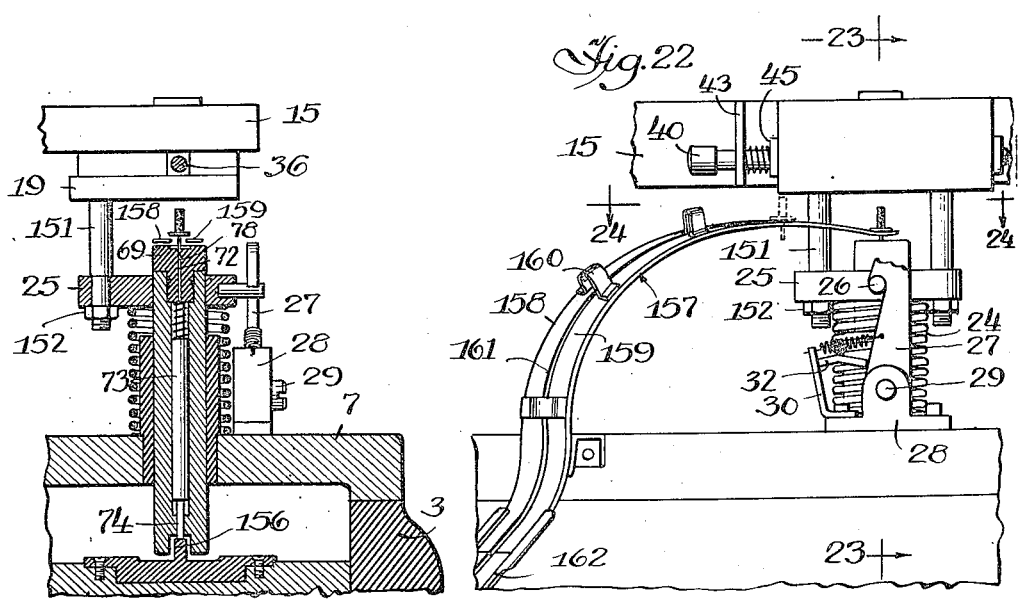

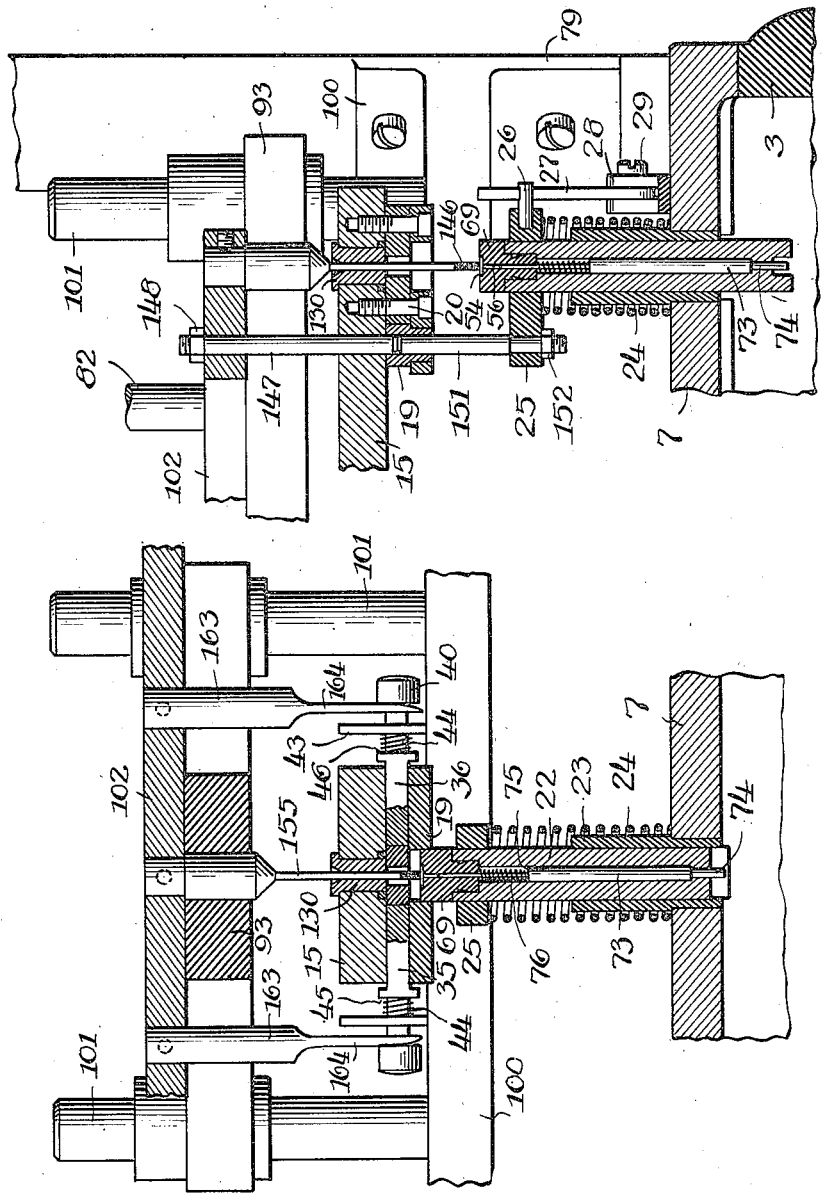

2,823,419

MACHINE FOR PRESSING TANTALUM CAPACITOR ELEMENTS

John D. Winters, Winnetka, Ill., and Rudolph J. Perme, Kenosha, Wis., assignors to Fansteel Metallurgical Corporation, a corporation of New York Application March 14, 1952, Serial No. 276,722

14 Claims. (Cl. 18—20)

This invention relates to an apparatus for compacting powder, and particularly for compacting tantalum metal powder to a predetermined porous condition.

Although the description of the invention will be limited, for the sake of convenience, to the production of a compacted tantalum electrode for subsequent use in a capacitor, it will be understood that the apparatus may be utilized to compact any powdered material to accurate pressures.

The apparatus constructed in accordance with the present invention is designed to compact metal powder around a capacitor element with predetermined vertical and lateral pressure simultaneously, so that after the compacted mass is sintered it will have uniform porosity throughout.

The process of compacting the tantalum metal powder comprises a sequence of different operations, and the apparatus is provided with a turntable indexed to stop at a plurality of different stations at each of which one step of the process is accomplished, with the result that a different capacitor element is positioned at each station every time the turntable stops, and each capacitor element is completely processed when it has traveled one complete cycle of the turntable. One capacitor element is fed into the apparatus at the first station and one is discharged at the last station every time the turntable stops, so that the process is continuous.

A small amount of binder is preferably added to the metal powder to increase the adhesion when the powder is compacted. The compact is very frangible, and therefore means is provided at the discharge station to keep the compacts out of contact with each other until after they are sintered. The sintering process unites the compacted tantalum metal powder permanently with the capacitor element which is made entirely of tantalum, and also causes the binder to volatilize so that the capacitance of the final product is not adversely affected by the presence of any binder.

The structure by means of which the above and other advantages of the invention are attained will be described in detail in the following specification, taken in conjunction with the accompanying drawings, showing a few preferred illustrative embodiments of the invention, in which:

Figure 1 is a front elevation of a machine embodying the invention;

Figure 2 is a vertical sectional view, taken along the line 2—2 of Figure 1;

Figure 3 is a cross sectional view, taken along the line 3—3 of Figure 1;

Figure 4 is a cross sectional view, taken along the line 4—4 of Figure 1;

Figure 5 is a vertical sectional view, taken along the line 5—5 of Figure 3, and showing the first or feeding station of the apparatus;

Figure 6 is a detail sectional view, similar to Figure 5, showing the lower end of the feed slide with the capacitor element just before it is dropped into the upper portion of the supporting post;

Figure 7 is a top elevation, taken generally along the line 7—7 of Figure 5, showing the entrance end of the feeding slide;

Figure 8 is a fragmentary perspective view of the exit end of the feeding slide;

Figure 9 is a vertical sectional view through the first station, taken along the line 9—9 of Figure 3;

Figure 10 is a fragmentary sectional view, similar to Figure 9, with the capacitor element raised, just before it is dropped into the upper portion of the supporting post;

Figure 11 is a cross sectional view, taken along the line 11—11 of Figure 9;

Figure 12 is a sectional detail of the exit end of the feeding slide of Figure 8;

Figure 13 is a sectional view, taken along line 13—13 of Figure 12;

Figure 14 is a vertical sectional view through the second station of the machine, taken along line 14—14 of Figure 3;

Figure 15 is a sectional view, taken along line 15—15 of Figure 14;

Figure 16 is a perspective detail of the jaws of the die for compacting the metal powder from opposite sides;

Figure 17 is a fragmentary top elevation, showing the portion of the capacitor element around which the metal powder has been compacted;

Figure 18 is a perspective detail of the capacitor element before the metal powder has been compacted thereon;

Figure 19 is a perspective detail of the capacitor element after the metal powder has been compacted thereagainst;

Figure 20 is a vertical sectional view through the third station, taken along the line 20—20 of Figure 3;

Figure 21 is a vertical sectional view through the fourth station, taken along the line 21—21 of Figure 3;

Figure 22 is a fragmentary perspective view of the fifth or discharge station of the apparatus;

Figure 23 is a vertical sectional view, taken along the line 23—23 of Figure 22;

Figure 24 is a cross sectional view, taken along the line 24—24 of Figure 22;

Figure 25 is a vertical sectional view, showing a modified embodiment of the fourth station of the machine in which means is provided for separating the jaws of the mold after the metal powder is compacted; and Figure 26 is another vertical sectional view, taken at right angles to Figure 25, showing the modified embodiment of the fourth station.

Referring to the drawings, the reference numerals 2 and 3 indicate a two part base, with base member 3 supported on the peripheral flange 4 of base member 2. Base member 3 is provided with a bottom 5 which is apertured to allow a center post 6 to project therethrough. A turntable 7 is rotatably mounted on center post 6 and the peripheral flange 8 of base member 3. A Geneva plate 9 (Fig. 2), apertured to fit around center post 6, is rigidly secured to the underside of turnable 7 by means of a plurality of studs or pins 10. A shaft 11, rotated by a hydraulic motor 12, extends through base member 2 and has the end hobbed to provide gear teeth for engagement with a gear 13 carrying the actuating part of the Geneva movement. The turntable 7 is indexed by the Geneva movement with stops of predetermined duration at each of six stations equally spaced circumferentially of the turntable. The Geneva movement and the mechanism for actuating it are conventional, and therefore will not be described. The turntable having six stations has been illustrated, in order to utilize a standard stock item that may be purchased on the open market, although only five stations are utilized. Each of the five stations is provided with mechanisms, hereinafter described, so that a different operation may be performed on each capacitor element as it is stopped at each station. The sixth station is idle, but does not interfere with the operation of the machine.

A plurality of supporting posts 14 are threaded into turntable 7 and are each shouldered at their upper ends to support a plate 15 in spaced relationship to the turntable. Nuts 16 are threaded on the upper ends of posts 14 and are tightened against the upper surface of plate 15 to hold it rigidly so that it moves with the turntable. As shown in Figure 3, plate 15 is provided with six peripheral recesses 17. Recesses 17 are similar and are spaced to leave similar extensions 18 projecting therebetween.

Each extension 18 has a block 19 (Figs. 2 and 5) rigidly secured to its underside by a plurality of studs 20. Each block 19 is provided with a vertical recess 21 (Figure 9) large enough to accommodate a supporting post 22 mounted in a bushing 23 mounted on turntable 7. The posts 22 are normally urged upwardly by spring 24 which encircles bushing 23. The bottom of spring 24 rests on the turntable 7 and the upper end presses against a collar 25 secured to post 22. Collar 25 is provided with a laterally projecting pin 26 which is at certain stages engaged by a latch 27 to hold it down against the action of spring 24.

The latch 27 is pivoted to a bracket 28, as indicated at 29 (Figure 14). Bracket 28 is secured to turntable 7 and is provided at one side with an arm 30 to which one end of a tension spring 31 is secured. The other end of spring 31 is secured to latch 27 so as to urge it constantly towards arm 30. A rigid stop member 32 extendsd from arm 30 towards latch 27 and engages the latch to limit its movement towards arm 30 so that it is normally positioned in vertical alignment with pin 26. The upper portion of latch 27 has its face 33 inclined downwardly towards arm 30 to form a hook end 34. As the collar 25 is pressed downwardly, the pin 26 will ride over face 33 and force the latch rearwardly relative to arm 30. When pin 26 passes below the hook end 34 of latch 27, spring 31 will pull the latch forwardly to hold the pin 26 against disengagement. The spring 24 urging collar 25 upwardly will force pin 26 upwardly into the hooked portion of latch 27 and also hold the pin in latched position.

Each block 19 is also provided with a transverse groove 19' in its top surface, into which complementary die members 35 and 36 (Fig. 16) are slidably fitted. Die member 35 has a recess 37 on its inner face, and die member 36 has a projection 38 adapted to fit within the side walls of recess 37. The inner face of projection 38 is provided with a semi-cylindrical recess 39 which cooperates with the bottom portion of recess 37 to form a cylindrical recess when die members 35 and 36 are brought together. The outer end of each member 35 and 36 extends outwardly beyond the edges of block 19 (Fig. 14) and each has an enlarged head 40. The dies are of suitably hard materials.

As shown in Figure 3, a bracket 41 is is rigidly secured in each recess 17 by means of bolts 42 threaded into the edge of plate 15. Each bracket has a pair of arms 43 extending parallel to the edges of extensions 18 and equally spaced therefrom. The arms 43 are apertured to fit loosely over the extensions of die members 35 and 36. A compression spring 44, encircling each extended portion of 35 and 36, has one end bearing against arm 43 and its other end bearing against shoulders 45 or 46 (Fig. 15) of die members 35 and 36 to urge the die members toward each other.

The mechanism for feeding the capacitor elements is shown in Figures 1 to 12, inclusive. A hopper 47 (Fig. 3) holds a supply of the capacitor elements in haphazard arrangement and feeds them successively into a slide 48. The hopper may be of any suitable construction, but the preferred structure comprises a recpetacle 49 having an inwardly projecting flange 50 arranged in the form of an ascending helix terminating in a horizontal member 51 (Figs. 5 and 7) provided with a longitudinally extending depression 52 having a slot 53 in its bottom. Flange 50 is of a width sufficient to accommodate only one of the capacitor elements. Each capacitor element (Fig. 18) comprises a flange or disk 54 having a pin 55 welded to one side and a pin 56 welded to the other side. The pins are located centrally of the flange 54 and are in axial alignment. The flange and both pins are made of tantalum or other suitable refractory metal.

Hooper 47 is constantly vibrated by any suitable means, and the vibration causes the capacitor elements to move upwardly along flange 50 (Figs. 5 and 7) in single file with each capacitor element resting on the periphery of flange 54 and one end of a pin. As each capacitor element reaches depression 52, the pin upon which it is partialy supported moves downwardly over the surface of the depression 52 and then into slot 53. For the sake of clarity, the pin which enters the slot will be hereafter referred to as pin 56, and the pin projecting upwardly will be pin 55. As each pin 56 enters slot 53 the capacitor element assumes an upright position and is aligned with the preceding elements, as indicated in Figure 7. The horizontal member 51 terminates adjacent the upper end of feed slide 48 (Fig. 5).

The upper end of feed slide 48 is pivotally supported on a bracket 57, as indicated at 58 (Figs. 1 and 5). The lower end of bracket 57 is bolted to the end of an L-shaped bracket 59 rigidly secured to base member 3. A leaf spring 60, secured at $60^1$ to bracket 57 provides a resilient support for the lower end of feed slide 48 which terminates adjacent the upper end of the post 22 at the first station. The slot 53 has an open or discharge end adjacent the upper end of feed slide 48, and the feed slide is provided with a downward recess 61 (Fig. 8) to receive pin 56 and a transverse recess 62 to receive flange 54. Feed slide 48 extends downwardly at an angle sufficient to permit the capacitor elements to slide down by gravity.

A flat plate 63 (Figs. 4, 8 and 11) is secured to the lower end of feed slide 48 and extends inwardly over the turntable 7 to a position adjacent a supporting post 22 at the first station. Plate 63 is provided with a slot 64 (Figs. 12 and 24), and the portion 65 on one side of slot 64 is cut away to provide clearance so that the capacitor element, when reaching the end of slot 64, may be moved laterally of plate 63 after it has been positioned in the top portion of supporting post 22 (Fig. 5).

As shown in Figures 5, 20 and 21, each post 22 is provided with an axial bore 66 having a reduced portion 67 at the bottom. The upper end of bore 66 is counterbored, as indicated at 68, and an insert 69 is secured in the counterbore 68 by means of a set screw 70 (Fig. 5). The lower portion of insert 69 is circumferentially recessed to provide an outwardly tapered surface 71 which cooperates with the set screw to hold insert 69 within counterbore 68 so that the post 22 and insert 69 constitute a rigid unit. Insert 69 is provided with an axial bore 72 coaxial with bore 66 but smaller in diameter. A pin 73 is seated in bore 66 and has a downwardly extending projection 74 (Fig. 20) of reduced diameter projecting through reduced portion 67. The upper portion of pin 73 is provided with a shoulder 75, and a coiled spring 76 positioned in bore 66 has one end bearing against shoulder 75 and its other end bearing against the bottom of insert 69 to normally urge pin 73 to the bottom of bore 66. A projection 77 (Fig. 5) of reduced diameter extends upwardly from pin 73 and supports a pin 78 which extends into bore 72. Pin 78 may be integral with pin 73 or may be separate, and supported on projection 77 in any suitable manner. The pin 56 of the capacitor element fits in the upper portion of bore 72, and the upper surface of insert 69 surrounding the bore 72 is recessed to form a flat seat 72¹ for flange 54 so that the capacitor element rests in the top of supporting post 22.

As shown in Figures 1, 2 and 3, an upright frame member 79 rigidly secured to a portion of the periphery of the base is provided with a forwardly extending flange 80 which supports a cylinder 81. A piston (not shown) is vertically reciprocably mounted in cylinder 81 and a piston ram 82 projects downwardly from the cylinder. An oil valve 83 is also supported on frame member 79 adjacent cylinder 81 and is provided with a plurality of oil lines 84, 85 and 86, which are connected to an oil reservoir 87 to control the flow of oil in cylinder 81. Hydraulic motor 12 is also connected to reservoir 87 and an electric motor 88 operates a pump (not shown) for supplying fluid to hydraulic motor 12 and oil valve 83. A control box 89, housing electrical controls (not shown) and a switch 90 for motor 88, is mounted on frame member 79. A control lever 91 is provided for the valve 83 so that when motor 88 is running, the piston ram 82 may remain stationary, may make one stroke only and stop, or may reciprocate continuously.

The flow of fluid from valve 83 is controlled by stem 92 connected to a slide valve (not shown). A plate 93 secured to the ram 82 adjacent its lower end carries a rod 94 which projects laterally therefrom into proximity to stem 92. A pair of stops 95 and 96 mounted on stem 92 are engaged by rod 94 in its vertical movement and move the stem vertically to reverse the slide valve. A cross arm 97 (Fig. 3) extending laterally from rod 94, trips a lever 98 to actuate a timer 99 by which the dwell of the press is controlled. Frame member 79 also provides a support for a flange 100 upon which a pair of upstanding guide rods 101 are mounted. The guide rods 101 engage apertures in plate 93, and registering apertures in a cross head 102 secured to piston ram 82 just above plate 93, to keep the press properly aligned.

In the operation of the apparatus, turntable 7 (Fig. 2) is rotated by hydraulic motor 12 to bring one post 22 to the first station, at which it is stopped by the Geneva movement 13. The hydraulic system controlling the reciprocation of piston ram 82 is synchronized with the hydraulic motor 12 so that the ram 82 starts its downward stroke immediately after the turntable 7 stops rotating. As previously mentioned, piston ram 82 carries crosshead 102 down with it. An arm 103 (Fig. 1), extending laterally from crosshead 102, has a downwardly extending part 104 (Figs. 1 and 9) rigidly secured to its outer end. Part 104 (Fig. 9) is provided with a downwardly sloping slot 105, the lower end of which is nearer the machine center than its upper end. An arm 106 (Figs. 3 and 9) has a pin 107 extending transversely through its rear end portion, and pin 107 is positioned in slot 105, thereby causing arm 106 to move forwardly when piston ram 82 moves upwardly, and rearwardly when the piston ram moves downwardly. As shown in Figure 11, the rear end portion of arm 106 is preferably bifurcated to straddle part 104, but it may have a single thickness and pin 107 may be secured in any suitable manner. Another arm 108 is pivotally secured at its rear end portion to the forward end of arm 106, as indicated at 109.

A block 110 mounted on the base has secured thereto a rod 111 at the forward end of which a pin or roller 112 is mounted. Pin 112 projects laterally into engagement with the lower edge of arm 108. The lower edge of arm 108 is offset downwardly, as shown at 113 (Fig. 9). When piston ram 82 moves downwardly, the rearward movement of arm 108 lifts its forward end as the offset portion 113 moves over pin 112. When piston ram 82 moves upwardly, arm 108 moves forwardly and its forward end moves down as offset 113 moves over pin 112 in the opposite direction. A spring 114, connected at one end to arm 108 and at its other end to support 110, urges arm 108 downwardly. The forward end 115 of arm 108 is offset laterally, and terminates just above plate 63 (Fig. 11) adjacent the bottom end of feed slide 48.

One corner of the laterally offset forward end portion 115 is recessed, as indicated at 116, Figures 8 and 11. When piston ram 82 moves upwardly, arm 108 is retracted, thereby allowing a capacitor element to move into the recess 116. The rearward movement of arm 108 is slight and the capacitor element stops against the back edge of the recess. Pin 112 (Fig. 11) causes end portion 115 to rise, and leaf spring 60 (Fig. 8) raises the lower end of feed slide 48 so that the capacitor element is lifted enough for its pin 56 to clear the top of post 22. A relatively narrow recess 117 is provided on the underside of the laterally offset portion 115 of arm 108. Recess 117 communicates with recess 116 and one side of its foremost end is positioned close to the lateral edge of portion 115 so that a sharp edge 118 is provided. When arm 108 is moved forwardly by the upward movement of piston ram 82, the edge 118 moves between the leading capacitor element and and the next one to position the leading one in recess 117 and hold back the rest of the capacitor elements in the feed slide. The forward movement of portion 115 causes the leading capacitor element to move outwardly in slot 64 and recess 117 until it reaches the outer end of portion 65 of plate 63. At this point, indicated at 119 in Figure 8, pin 56 is aligned with bore 72 (Fig. 12) in post 22 and offset 113 (Fig. 9) engages roller 112 so that end portion 115 is lowered to position pin 56 in bore 72.

The Geneva movement 13 causes turntable 7 to resume its travel and post 22 carries the capacitor element to the second station. The portion of recess 117 extending from point 119 (Fig. 8) to the rear edge of laterally offset portion 115 is curved, as indicated at 120. Thus, the curved recess conforms to the curvature of the path of travel of post 22, permitting pin 55 to move through recess 117 to clear offset portion 115 as turntable 7 is rotated to move post 22 towards the second station.

Before post 22 reaches the second station, the upper end of latch 27 (Fig. 9) engages the forward edge 121 of a cam 122 mounted on block 110 and curved to conform to the path of travel of post 22. Latch 27 is moved to the left about its pivot 29 as post 22 moves past the forward edge 121 of the cam. This pivotal movement of the latch releases pin 26, but the pin engages the lower edge 123 of cam 122 and holds it against the force of spring 24 to prevent post 22 from moving upwardly too abruptly. The lower edge 123 of cam 122 slopes upwardly towards its rear edge, and the pin 26 rides upwardly in contact with this edge to cause the post 22, whose vertical movement is controlled by the engagement of pin 26 with the lower edge of cam 122, to rise gradually, under the influence of spring 24, as turntable 7 is rotated. As soon as latch 27 clears cam 122, collar 25 moves to its uppermost position under the influence of spring 24, and latch 27 moves back to its vertical position under the influence of spring 31 to the position illustrated in Figure 14, with one edge engaging the stop member 32. The post 22 remains in this position as the rotation of turntable 7 is halted with post 22 at the second station.

A powder dispensing hopper 124 (Fig. 1) is mounted on flange 80 at the second station. The hopper 124 contains a supply of tantalum metal powder which is dispensed in measured amounts through a tube 125 by a rotary feed 126 which is controlled by a rack 127. A small amount of a suitable binder, such as "Glyptal," which is a glycerine-phthalic anhydride resin, is added to the tantalum metal powder contained in the hopper. The binder causes the contacting edges of the particles of tantalum to adhere to each other during the compacting operation so that the compacted tantalum metal powder, which is quite frangible, will hold together until the sintering operation. The temperature of approximately 2000° C. to which the capacitor elements are subjected in the sintering operation volatilizes the binder so that the capacitor elements contain nothing but tantalum after they are sintered and the capacitance of the elements is not adversely affected.

The lower end of rack 127 is secured to crosshead 102 so that the rack moves vertically with the crosshead. Every time the rack moves downwardly, it rotates a pinion (not shown) connected to rotary feed means 126, and causes a predetermined amount of tantalum metal powder to fall through tube 125. Tube 125 extends through an aperture 128 (Fig. 14) in crosshead 102 and terminates adjacent an opening 129 in an insert 130 secured to plate 15. The opening 129 is in vertical alignment with the pin 55 which is positioned between opposed recesses 37 and 39 of die members 35 and 36, respectively (Fig. 17).

Depending members 131 (Figs. 14 and 2) are secured to crosshead 102 by set screws 133. The lower portion of each member 131 is cut away to form a finger 134 which is in alignment with the space between the enlarged head 40 and the adjacent arm 43 of bracket 41. Fingers 134 are preferably bifurcated at their lower ends (Figs. 1 and 2) so as to fit around the die members as crosshead 102 moves downwardly. The outer edge of finger 134 extends outwardly slightly beyond the inner surface of enlarged head 40. The extreme lower end of finger 134 is beveled inwardly, as indicated at 135 (Fig. 14) so that the fingers will fit between the enlarged head 40 and bracket arm 43 when the crosshead 102 moves downwardly. As fingers 134 move downwardly, they separate heads 40 for a pair of dies slightly and thereby enlarge the vertical recess between the inner meeting edges of die members 35 and 36. The enlargement of the vertical recess between die members 35 and 36 permits the tantalum metal powder passing through tube 125 and opening 129 to enter the enlarged recess. Upon the upstroke of piston ram 82, the crosshead 102 moves fingers 134 upwardly out of contact with heads 40, and springs 44 force die members 35 and 36 inwardly to their normal position. In this position the vertical recess between the inner ends of the die members has a diameter of the size desired for the pin 55 in the completed capacitor element. The tantalum metal powder is loosely disposed in this vertical recess on top of flange 54 and around pin 55. Motor 12 now indexes turntable 7 to move post 22 carrying the capacitor element to the third station.

The plate 93, positioned adjacent the third station, has a guide rod 136 (Fig. 2) and a stop member 132 depending therefrom. The guide rod and stop member are secured to plate 93 in any suitable manner. Guide rod 136 is axially aligned with a bushing 137 fitted in an aperture 138 in plate 15. Every time ram 82 moves downwardly, the guide rod 136 enters the bore of the bushing positioned under it and cooperates with the guide rods 101 in keeping the parts properly aligned. The stop member 132 engages the top surface of plate 15 at the end of the downstroke of piston ram 82.

The third station comprises the powder compacting mechanism, as shown in Figure 20. At this station, a cam 139 is secured to bottom 5 of base member 3 by bolts 140. The upper surface of cam 139 extends upwardly substantially to the lower surface of turntable 7 under the bushing 23 to engage the lower end of supporting post 22, thereby forming a solid support for pin 56 during the powder compacting operation. A pair of depending members 141, secured to crosshead 102 by set screws 142, are provided with fingers 143 which engage the outer surfaces of enlarged heads 40 when crosshead 102 moves downwardly. Fingers 143 prevent die members 35 and 36 from spreading outwardly under the force of the pressure applied to the tantalum metal powder during the compacting operation. Fingers 143 are also effective to press die members 35 and 36 inwardly to their normal position if, for any reason, springs 44 fail to do so after the die members have been moved outwardly by fingers 134.

A pressing pin 144, secured in the lower end of piston ram 82 by a set screw 145 projects into opening 129 to press the tantalum metal powder downwardly. The pressure on the piston ram is maintained at about 400 pounds per square inch to assure correct porosity in the final product. The pressure exerted by pin 144 and die members 35 and 36 is sufficient to compact the tantalum metal powder around the tantalum pin 55 with the individual particles adhered to each other only at the points of surface contact with the binder. The pressure is not great enough to force the particles together into a solid mass. Accordingly, after the compacted capacitor element has been sintered and the binder volatilized, the particles of tantalum powder compacted around the pin 55 touch only at discontinuous surface areas. Thus, many fine spaces between individual particles provide the capacitor element with a degree of porosity determined by the pressure applied by pin 144. After the tantalum metal powder has been compacted around pin 55, as indicated at 146 (Fig. 19), the piston ram 82 moves upwardly until pin 144 (Fig. 20) is raised above opening 129. As soon as pin 144 clears opening 129, turntable 7 is rotated to move the post 22 to the fourth station.

At the fourth station a pair of pusher pins 147 (Fig. 21) are threaded into crosshead 102 and are secured thereto by nuts 148. Pins 147 project downwardly in vertical alignment with apertures 149 in plate 15 and registering apertures 150 in blocks 19. A pair of pins 151 secured to each collar 25 by nuts 152 and projecting upwardly therefrom extend into apertures 150 and are therefore axially aligned with pusher pins 147 as each post 22 stops at the fourth station. The portion of each pin 151 projecting through aperture 153 in collar 25 is of reduced diameter so as to provide a shoulder 154 abutting the upper surface of collar 25. When crosshead 102 is moved downwardly, the pusher pins 147 engage pins 151 and depress them, thereby moving collar 25 and post 22 down against the action of spring 24. As collar 25 moves downwardly, the pin 26 rides downwardly over the face 33 of latch 27 (Fig. 14), moving the latch against the force of spring 31, until pin 26 passes the hook end 34. Spring 31 then pulls latch 27 forwardly to engage pin 26 so that post 22 is held down until latch 27 is released by cam 122 (Fig. 9). Plate 93 (Fig. 21) has secured thereto an ejecting pin 155 which projects downwardly through opening 129 in insert 130 and engages the top of compacted portion 146 of the capacitor element to prevent the compacted capacitor element from sticking in the recess of the die members in which the tantalum metal powder has been compacted. The compacted capacitor element moves downwardly with the post 22. The removal of each capacitor element from the die members is important because if any of the tantalum metal powder sticks to the die members it would very likely interfere with the compacting of all succeeding capacitor elements until the die members are cleaned. After the capacitor element has been ejected from the die members and piston ram 82 has moved upwardly, turntable 7 is then indexed to move the post 22 to the fifth station. At this station the capacitor element is removed from the post 22.

At the fifth station, the pin 73 is raised by a cam 156 (Fig. 23) which engages projection 74 of pin 73. As pin 78 is pushed upwardly through bore 72 of insert 69, it pushes the capacitor element upwardly, and continued rotation of post 22 brings the capacitor element into engagement with a chute 157 (Fig. 22) comprising two strips 158 and 159 held in parallel spaced relationship by a plurality of arched pieces 160. Pin 56 enters the slot 161 between strips 158 and 159 with flange 54 resting on the strips. Pieces 160 provide sufficient clearance for pins 146 to pass therethrough. Chute 157 is inclined upwardly to raise pin 56 out of bore 72 (Fig. 23) as post 22 is being rotated past the fifth station. As shown in Figure 24, chute 157 is curved outwardly so that after the capacitor elements are lifted out of bore 72, they are moved towards the outer edge of the apparatus by succeeding capacitor elements, the flange 54 of each capacitor element engaging the flange of the preceding capacitor element and moving the preceding element along the chute 157. Chute 157 may slope downwardly from the point at which the capacitor elements are lifted out of bore 72 in order that each capacitor element may slide down by gravity after it has been pushed over the hump by the succeeding capacitor element. It should be noted that the engagement of the flange of one capacitor element with the flange of the preceding capacitor element protects the compact 146 from contact with any object and thereby prevents breakage. Chute 157 leads to a similar chute or rack 162 which is removable. Rack 162, which holds a predetermined number of capacitor elements, is removed as soon as it is filled and is replaced by another rack. The filled racks provide convenient means for handling the compacted capacitor elements until they are sintered.

In Figures 25 and 26 a modified form of the fourth station is shown. The structure of this embodiment differs from the preferred embodiment in only one detail, and the structure of the apparatus that is the same will be designated by the same reference numerals. Members 163 are secured to crosshead 102 and have fingers 164 vertically aligned with die members 35 and 36. Fingers 164 are preferably bifurcated the same as fingers 134. The outer edges of fingers 164 are spaced from each other a distance slightly greater than the normal distance between the inner surfaces of enlarged heads 40. Accordingly, when crosshead 102 moves downwardly to carry pusher pins 147 into engagement with pins 151 the outer edges of fingers 164 engage the inner surfaces of heads 40 to force the die members 35 and 36 apart slightly to facilitate ejection of the enlarged portion 146 of the capacitor element from the die members.

While we have described two preferred embodiments of the invention in considerable detail, it will be understood that the description is intended to be illustrative, rather than restrictive, as many details may be modified or changed without departing from the scope of the appended claims. Accordingly, we do not desire to be restricted to the exact structure described.

We claim:

1. An apparatus for compacting metal powder around an article comprising a plurality of supports for carrying said articles individually, means for intermittently moving said supports successively through a plurality of stations, a feeder positioned at one of said stations and adapted to position individual articles on successive supports as said supports are successively positioned at said station, a powder dispenser means positioned at a second station to apply a measured quantity of metal powder adjacent the article against which it is to be compacted, vertical pressure means adjacent a third station, a pair of horizontally movable dies for each of said supports, said vertical pressure means cooperating with said dies at said third station to press said powder against said article uniformly in vertical and lateral directions, means for retracting said vertical pressure means before said article is moved from said third station, means at a fourth station for separating said horizontally movable dies by horizontal outward movement to release said compacted article from said dies, and means at a fifth station for removing said compacted article from said supports.

2. In an apparatus for compacting metal powder against a portion of an article, a plurality of individual supports each adapted to carry one of said articles, each of said supports comprising a portion substantially concealing all of the article except the portion against which the metal powder is to be compacted and a pair of horizontally movable dies interengageable around the portion of the article against which the powder is to be compacted, means for intermittently moving said supports to bring them successively to a plurality of different stations, means at one of said stations to move said dies outwardly to provide space around the portion of the article against which the metal powder is to be compacted, means to pour a measured quantity of metal powder into the space about said portion, means adjacent another station to move said dies inwardly, a vertically movable ram adjacent said last mentioned station to compact said powder, means to move said ram in timed relation to said supports for compacting the powder, and means at another station to remove said article from said support.

3. In an apparatus for compacting metal powder against an article, a post having an axial bore, said post supporting said article with a measured quantity of metal powder adjacent the article against which it is to be compacted, a pair of dies movable horizontally to embrace the sides of said article and to press said powder against the sides of said article, a pin movable downwardly above said article to compress said powder in a vertical direction, means to move said dies and said pin simultaneously, a pin projecting through said post vertically to engage the bottom of said article, and a cam engageable with said last mentioned pin to raise it as said first mentioned pin moves downwardly, whereby said powder is compressed laterally and vertically simultaneously.

4. In an apparatus for compacting metal powder against one pin of an article comprising a flange and a pair of pins extending perpendicularly from opposite surfaces of said flange, a post having an axial bore, means for automatically positioning said article on said post with one of said pins in said axial bore, a pair of horizontally movable dies embracing the other pin of said article, means for moving said dies outwardly, means for automatically positioning a predetermined quantity of metal powder between said dies, means for automatically closing said dies to press said powder horizontally around said second pin, a piston ram movable downwardly above the second pin, a pressing pin depending from said ram and engageable with the top of said second pin to press said powder vertically, means for moving said ram to obtain powder pressing movement, means for moving said post downwardly to separate said second pin with the metal powder compacted thereagainst from said dies, and means to eject said article from said post.

5. In an apparatus for compacting metal powder against a portion of an article, a turntable indexed to rotate intermittently with stops of uniform duration at each of a plurality of stations, a plurality of supporting posts mounted on said turntable so that one post is positioned at each station during each of said stops, means for positioning one of said articles on each of said posts as said posts are successively positioned at the first of said stations, a plate positioned above said posts in spaced relationship thereto, a plurality of blocks secured to the underside of said plate, each of said blocks being aligned with one of said posts, and a pair of complementary dies mounted for relative horizontal movement in each of said blocks, said dies embracing the portion of said article against which the metal powder is to be compacted, means for moving at least one of said dies outwardly as said posts are positioned adjacent a second station, a powder dispenser at said second station for applying a predetermined quantity of metal powder between said dies, means for closing said dies together to compact said metal powder horizontally against said portion of the article, means for simultaneously compacting said powder vertically, and means for automatically ejecting said article with the metal powder compacted thereagainst from said apparatus.

6. In an apparatus for compacting metal powder against one pin of a capacitor element, a support for holding said pin upright, a block positioned above said pin, a pair of complementary dies in said block on opposite sides of said upright pin, each of said dies having an enlarged end projecting laterally from opposite edges of said block, a verticaly reciprocable member mounted above said dies, fingers depending from said member and engageable with said enlarged ends and having means to move at least one of said dies outwardly relative to the other upon downward movement of said vertically reciprocable member, means to apply a predetermined quantity of metal powder between said dies when said dies are in their outer position, a second vertically reciprocable member spaced horizontally from said first mentioned member, means for moving said support under said second vertically reciprocable member, fingers depending from said second mentioned member, said fingers being engageable with said enlarged ends upon downward movement of said second member and having means to hold said dies in their inner position, a pressing pin secured to said second member and engageable with the top of said upright pin upon downward movement of said second member to apply vertical pressure to said metal powder, said pressing pin and said dies cooperating to compact said metal powder into self-sustaining form against said upright pin.

7. An apparatus according to claim 6 in which said support comprises a post provided with an axial bore, said capacitor element having a second pin positioned in said bore, an ejector pin positioned in said bore beneath said second capacitor pin, and a cam operable to press said ejector pin against the bottom of said second capacitor pin when said pressing pin engages the top of said first capacitor pin.

8. An apparatus according to claim 6 in which said support comprises a post provided with an axial bore, said capacitor element having a second pin positioned in said bore, an ejector pin positioned in said bore beneath said second capacitor pin, a cam operable to press said ejector pin against the bottom of said second capacitor pin when said pressing pin engages the top of said first capacitor pin, means for moving said support to a discharge station, and a cam engaging said ejector pin at said discharge station to lift said capacitor vertically relative to said support.

9. In an apparatus for compacting metal powder against one pin of a capacitor element, a support for holding said pin upright, a block positioned above said pin, a pair of complementary dies mounted for relative horizontal movement in said block on opposite sides of said upright pin, said dies having end portions projecting from opposite sides of said block, a vertically movable member having a pressing pin aligned vertically with said upright pin, means to move said pressing pin into engagement with the top of said upright pin, and a pair of spaced fingers depending from said vertically movable member, said fingers engaging the projecting end portions of said dies to prevent separating movement thereof when said vertically movable member is in its lowermost position.

10. In an apparatus for compacting metal powder against one pin of a capacitor element, a support for holding said pin upright, a block positioned above said pin, a bracket mounted adjacent said block, said bracket having an arm projecting therefrom, a pair of complementary dies mounted for relative horizontal movement in said block on opposite sides of said upright pin, at least one of said dies having an end portion within the arm of said bracket, and a spring positioned around said end portion between said arm and the die block proper, said spring exerting constant force against the end of said die to urge said die toward its innermost position within said block.

11. In an apparatus for compacting metal powder against one portion of a capacitor element, a support mounted on a turntable rotatable intermittently through a plurality of stations, a spring adjacent said support urging said support upwardly to a predetermined height, a laterally projecting pin operatively connected to said support, a latch adjacent said support, said latch being engageable with said pin to hold said support in depressed position, means adjacent one of said stations to depress said support as it is positioned at said station, means moving said latch into engagement with said pin at said station, and a cam adjacent another of said stations engageable with said latch to disengage it from said pin, whereby said spring moves said support upwardly to said predetermined height.

12. In an apparatus for compacting metal powder against one portion of a capacitor element, a support mounted on a turntable rotatable intermittently through a plurality of stations, a spring adjacent said support urging said support upwardly to a predetermined height, a laterally projecting pin operatively connected to said support, a latch adjacent said support, said latch being engageable with said pin to hold said support in depressed position, means adjacent one of said stations to depress said support as it is positioned at said station, means moving said latch into engagement with said pin at said station, and a cam adjacent another of said stations engageable with said latch to disengage it from said pin, whereby said spring moves said support upwardly to said predetermined height, said cam engaging said pin, upon release of said pin from said latch, to regulate the speed of rise of said support from its depressed position to said predetermined height.

13. In an apparatus for compacting metal powder against a capacitor element having a pin projecting therefrom, a supporting post mounted on a rotatable turntable, said post having a vertical bore adapted to receive said pin, a plate having a slot provided with an open end terminating adjacent said post, a feed slide operable to deliver capacitor pins to said plate with said pin projecting through said slot, an arm having a recess engageable with said capacitor element, means to move said arm relative to said post, means to lift said arm and said plate as said arm is moved relative to said post, said recess being shaped to guide said capacitor element into position with said pin over said bore as said arm is lifted, and means to lower said arm to position said pin in said bore, the continuation of said recess being shaped to permit said capacitor to move out of engagement with said arm as said turntable is rotated.

14. In an apparatus for compacting metal powder against one pin of a capacitor element, a support for holding said pin upright, a block positioned above said pin, a bracket mounted adjacent said block, said bracket having two arms projecting therefrom, a pair of complementary dies mounted for horizontal movement in said block on opposite sides of said upright pin, each of said dies having an enlarged end projecting laterally from opposite edges of said block through one arm of said bracket, a spring positioned between each of said arms and the adjacent edge of said block, each of said springs exerting constant force against the projecting end of one of said dies to urge said dies toward their innermost position within said block, a pair of fingers each engageable between one of said bracket arms and the adjacent enlarged end of said dies to spread said dies outwardly, a tube having one end positioned above said dies, and means operable when said dies are spread outwardly to dispense a perdetermined quantity of metal powder through said tube into the space between said dies.

(References on following page)

References Cited in the file of this patent

UNITED STATES PATENTS

| | | |
|---|---|---|
| 1,081,618 | Madden | Dec. 16, 1913 |
| 1,174,646 | Williams | Mar. 7, 1916 |
| 1,226,470 | Coolidge | May 15, 1917 |
| 1,286,089 | Pfansteihl | Nov. 26, 1918 |
| 1,321,125 | Pfansteihl | Nov. 11, 1919 |
| 1,731,255 | Marden | Oct. 15, 1929 |
| 2,235,504 | Rennie | Mar. 18, 1941 |
| 2,298,908 | Wentworth | Oct. 13, 1942 |
| 2,350,971 | Pecker et al. | June 6, 1944 |
| 2,386,544 | Crowley | Oct. 9, 1945 |
| 2,390,160 | Marvin | Dec. 4, 1945 |
| 2,477,601 | Hanson | Aug. 2, 1949 |
| 2,499,530 | Scott | Mar. 7, 1950 |
| 2,509,783 | Richardson | May 30, 1950 |
| 2,562,876 | Baeza | Aug. 7, 1951 |
| 2,570,989 | Seelig | Oct. 9, 1951 |
| 2,627,765 | Hopkins | Feb. 10, 1953 |